INVENTOR.
DONALD C. CONNETT
ROBERT W. McJONES
Van Meter and George
ATTORNEYS

United States Patent Office 3,402,549
Patented Sept. 24, 1968

3,402,549
HYDROSTATIC TRANSMISSION
Donald C. Connett, Rochester, Mich., and Robert W. McJones, Palos Verdes Estates, Calif., assignors to Sperry Rand Corporation, Troy, Mich., a corporation of Delaware
Filed Jan. 13, 1967, Ser. No. 609,158
21 Claims. (Cl. 60—19)

ABSTRACT OF THE DISCLOSURE

A control arrangement for a hydrostatic transmission having an engine driven pump and a variable displacement fluid motor for automatically engaging or disengaging the transmission and for automatically varying the transmission ratio of output speed and torque at various engine speeds as a function of engine throttle position. A sensing valve controls a by-pass valve and a compensator valve which in turn, respectively, regulates the flow of fluid to the motor and the displacement of the motor as a function of throttle position.

Background of the invention

Figure 1:
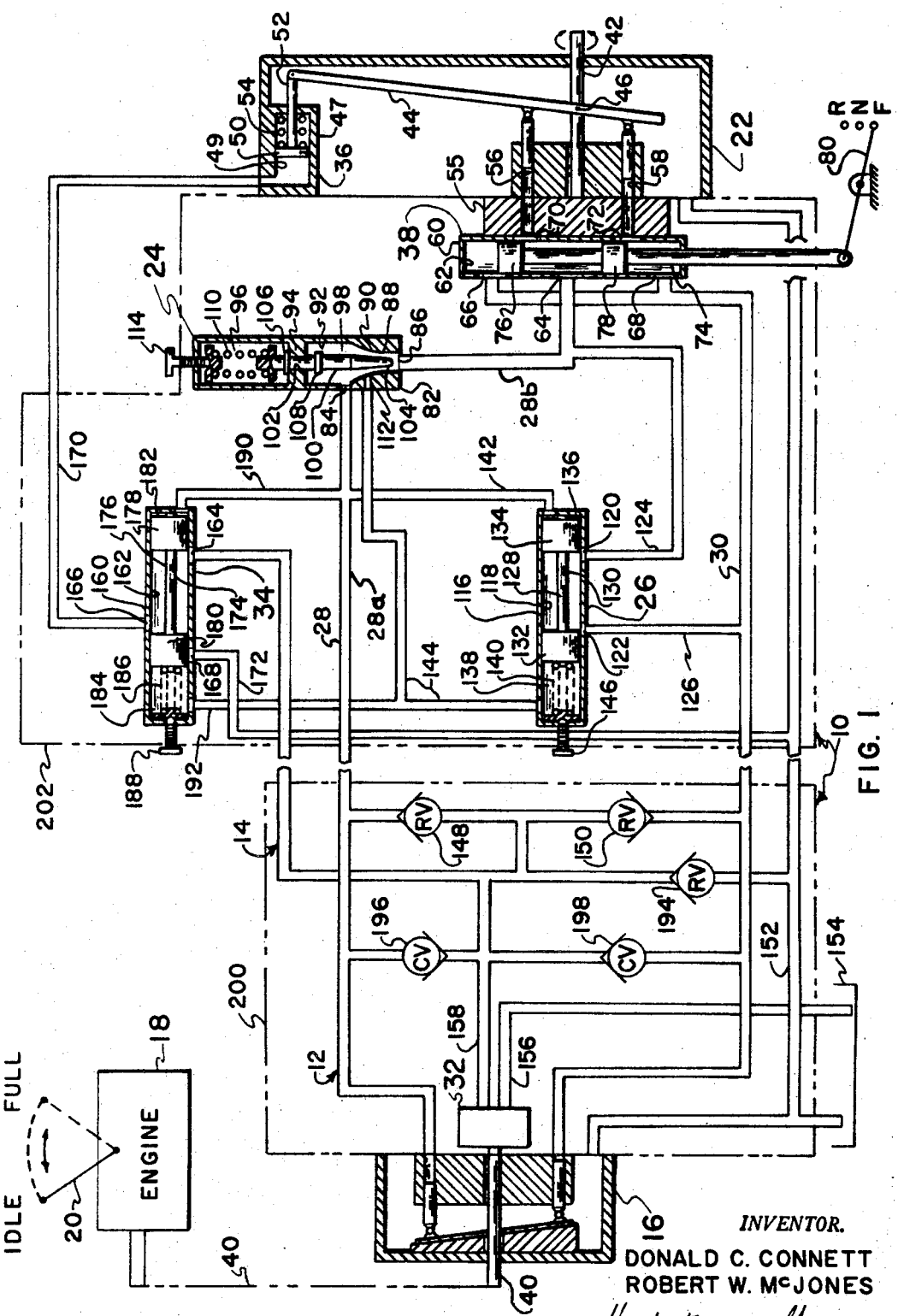

This invention pertains to power transmission and is particularly applicable to hydrostatic transmissions of the type comprising two or more fluid pressure energy translating devices, one of which normally functions as a pump and another normally as a motor. Specifically, this invention pertains to a hydrostatic transmission for propelling industrial and commercal vehicles, such as lift trucks, shovel loaders, personnel carriers, and other similar type vehicles employing a variable speed engine, the speed of which is varied manually by the operator. More specifically, this invention relates to an engine driven hydrostatic transmission having a new and unique control arrangement therefor, which makes the transmission responsive to the position of the engine throttle pedal.

In the past, hydrostatic transmissions have found limited applications in the over-all vehicle transmission market. The most commonly used hydrostatic transmission for propelling various type vehicles comprises a variable displacement pump and a fixed displacement motor, commonly designated as a PV/MF transmission. The PV/MF transmission is generally used on vehicles where constant engine speed is required for an auxiliary function. Such vehicles include industrial sweepers, farm tractors and combines, and the like. However, for applications where the vehicle operator desires to control the vehicle speed by operation of the engine throttle, the PV/MF transmisison is not generally suitable. In an effort to broaden the application of hydrostatic transmissions in the vehicle transmission market, a fixed displacement pump/variable displacement motor combination has been employed. This combination has found limited applications primarily because of the lack of suitable controls, in that the vehicle operator had to perform too many manual control functions in order to achieve proper vehicle performance.

Summary

Basically, the throttle responsive hydrostatic transmission disclosed herein comprises a fixed displacement pump driven by a throttle controlled variable speed engine, a variable displacement motor driven by the fluid delivered by the pump, sensing means providing a pressure differential control signal which is responsive to engine throttle position, by-pass means responsive to the control signal for controlling the flow rate of fluid to the motor to smoothly engage and disengage the transmission and compensator means also responsive to the control signal for controlling the volumetric displacement of the motor to vary the transmission ratio of the transmission.

An object of this invention is to broaden the applications of hydrostatic transmissions by providing a throttle responsive hydrostatic transmission having a new and unique control arrangement to include vehicle applications where the vehicle operator can control vehicle speed in response to operation of the engine throttle.

It is an object of this invention to provide a throttle responsive hydrostatic transmission having a new and unique control arrangement which will automatically and smoothly engage the transmission over a wide range of engine speeds in response to varying positions of the engine throttle and which will vary the transmission ratio of speed and torque over a wide range of engine speeds and in response to varying positions of the engine throttle.

It is another object of this invention to provide a throttle responsive hydrostatic transmission which will operate more efficiently at low vehicle speeds than a torque converter.

Another object of this invention is to provide a throttle responsive hydrostatic transmission which is completely stepless throughout its transmission range.

A further object of this invention is to provide a throttle responsive hydrostatic transmission which will provide full power at both high torque/low speed and low torque/high speed conditions.

Another object of this invention is to provide a low cost throttle responsive hydrostatic transmission which is precisely controllable, rugged, compact, and easy to maintain and disassemble for repairs.

Further objects and advantages of the present invention will be apparent from the following description, reference being had to the accompanying drawings wherein a preferred form of the present invention is clearly shown.

In the drawings

FIG. 1 schematically illustrates a preferred embodiment of the present invention showing sectional views of each of the primary elements or components forming the throttle responsive hydrostatic transmission.

Figure 2:
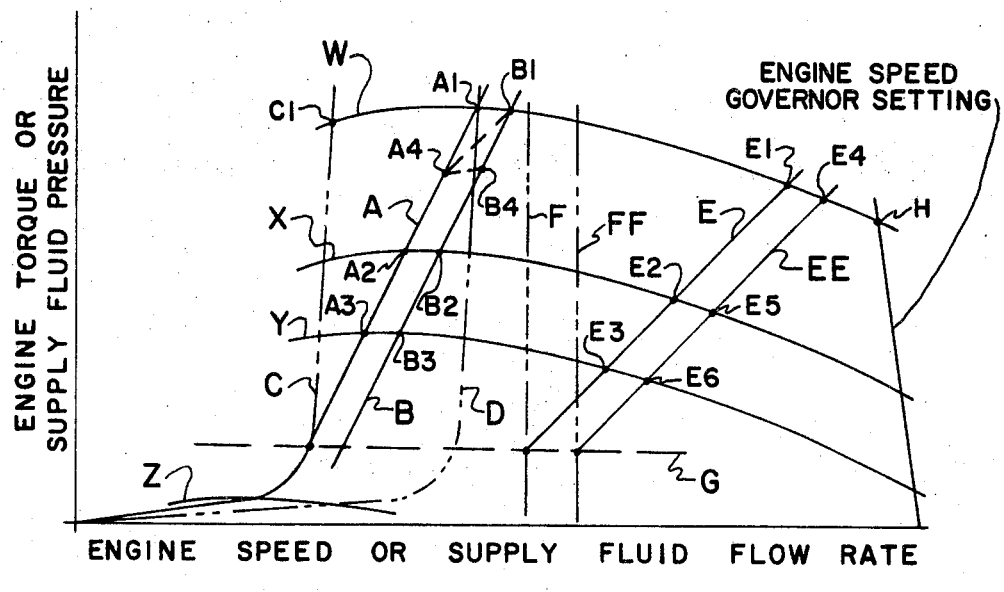

FIG. 2 is a graph illustrating the comparative performance of the throttle responsive hydrostatic transmission and the engine.

General construction

Referring to FIG. 1, the throttle responsive hydrostatic transmission 10 embodying the present invention comprises a power circuit 12 and a control circuit 14. Power circuit 12 includes a fixed volumetric displacement power pump 16 driven by an engine 18 having a throttle 20. Pump 16 supplies fluid to a variable volumetric displacement motor 22. A sensing valve 24 produces a control signal comprising a pressure differential which varies in response to both the flow rate and pressure of fluid supplied by pump 16. A by-pass valve 26 is operated by the control signal and regulates the flow rate of fluid to motor 22 by controlling the diversion of fluid from a supply conduit 28 to a return conduit 30 to engage and disengage the transmission 10.

The control circuit 14 includes a control pump 32, also operated by the engine 18, and a compensator valve 34. The pump 32 supplies fluid for actuating a volumetric control cylinder 36 which varies the volumetric displacement of motor 22. The compensator valve 34 is also operated by the control signal and regulates the flow of fluid to and from the control cylinder 36 and thereby controls the volumetric displacement of motor 22 and thus the transmission ratio. The direction of rotation of motor 22 is controlled by a directional control valve 38.

General operation

After the engine 18 has been started and the directional control valve 38 has been shifted to a forward or reverse position, actuation of the engine throttle 20 causes fluid from pump 16 to flow to motor 22 through the sensing valve 24. Since the by-pass valve 26 is normally biased to a by-pass condition, posing less resistance to flow than the motor 20, the fluid supplied by pump 16 will initially bypass motor 22 and return to pump 16 through the return conduit 30. As the engine 18 accelerates and the flow rate and fluid pressure of the fluid delivery by pump 16 increases, the control signal produced by sensing valve 24 operates by-pass valve 26 to gradually restrict flow of fluid through the by-pass valve and thereby direct fluid flow to drive motor 22. As the engine 18 continues to accelerate, the by-pass valve 26 finally reaches a closed position whereby all of the fluid is directed to motor 22. At this point the transmission is completely engaged. The compensator valve 34, being normally biased to an open position, allows fluid from pump 32 to flow directly to control cylinder 36, positioning motor 22 at a maximum displacement position. Upon continued acceleration of the engine, the compensator valve 34 is operated by the control signal from the sensing valve 24, thereby decreasing the displacement of the motor 22 and, in turn, reducing the transmission ratio of the transmission 10.

*Detailed construction*

The power circuit 12 includes the fixed volumetric displacement power pump 16 and the variable volumetric displacement motor 22. Preferably, the pump and motor are of the axial piston, swash plate type well known in the art; although other types of fixed and variable displacement units may be used. Pump 16 and motor 22 are connected hydraulically by supply conduit 28 and return conduit 30 to establish a hydraulic circuit for the transfer of fluid therebetween. The propulsion engine 18 of the vehicle, which may be of the usual internal combustion type, is drivingly connected to pump 16 by means of a drive shaft 40. The engine throttle 20 is manually operable to a plurality of operating positions between an idle and a maximum or full throttle position for varying the speed and output torque of engine 18. Since pump 16 is of the fixed displacement type, the flow rate of fluid supplied thereby is directly proportional to the output speed of ngine 18. Unlike the conventional hydrostatic transmission, which generally comprises a variable displacement pump and a fixed displacement motor, wherein the supply pressure is proportional to the load on motor, the supply pressure in the throttle responsive hydrostatic transmission delivered by pump 16 to motor 22 is directly proportional to the torque developed by engine 18, and thus is independent of load on the motor 22. Thus, since the output torque of engine 18 is proportional to the position of throttle 20, the supply fluid pressure of pump 14 is also proportional to throttle position.

Motor 22 has an output shaft 42 adapted for driving the wheels of the vehicle by suitable means, not shown. Motor 22 has a swash plate 44 trunnion mounted for movement about an axis designated 46 to an infinite number of positions on one side of center for varying the volumetric displacement of motor 22 between a minimum and a maximum, and thus the output torque and speed of shaft 42. Swash plate 44 is actuated by the single acting control cylinder 36. Control cylinder 36 has a spring biased pressure responsive piston 50 slidably fitted in a bore 49 within a cylinder body 47 and attached to swash plate 44 by a connecting rod 52. A spring 54 normally biases piston 50 to the left, actuating swash plate 44 to a position which provides motor 16 with minimum displacement. Piston 50 is hydraulically actuated toward the right when sufficient fluid pressure is provided to control cylinder 36 to overcome the combined opposing force of spring 54 and any existing hydrodynamic forces on swash plate 44. When piston 50 is fully actuated to the right, swash plate 44 is positioned so as to provide motor 22 with maximum displacement. Motor 22 has a valve block 55 containing fluid ports 56 and 58 which function alternately as inlet and outlet ports.

The output torque and speed delivered by motor 22 to the wheels of the vehicle through the output shaft 42 is a function of supply pressure and flow rate of fluid supplied to the motor, respectively, and the volumetric displacement of the motor. When the volumetric displacement of motor 22 remains constant, the output torque and speed varies proportionately with changes in supply pressure and flow rate, respectively. When supply fluid pressure and flow rate remain constant, the output torque varies proportionately with changes in displacement and the speed varies as an inverse function of displacement. For instance, when the supply fluid pressure and flow rate supplied to motor 22 remain constant and the displacement is decreased, the torque decreases proportionately and the speed increases proportionately.

Directional control valve 38 is a conventional open-center, three-position, four-way valve, the purpose of which is to provide a simple and inexpensive means for reversing the rotation of motor 22. The valve 38 is mounted on valve block 55 and connected thereto by means not shown. Valve 38 has a body 60 having a longitudinal bore 62. Body 60 has several external ports, each of which are in communication with bore 62. They are: a supply port 64 connected to supply conduit 28, a pair of return ports 66 and 68 connected to return conduit 30, and a pair of spaced apart control ports 70 and 72 in communication with the motor ports 56 and 58 respectively. A spool 74, having a pair of lands 76 and 78 slidably fitted in bore 62, is shiftable by means of a lever 80, attached thereto. Lever 80 is manually shiftable to three positions, designated F, N, and R, as shown in FIG. 1. These positions provide the transmission with forward, neutral, and reverse modes of operation, respectively. The width of each land 76 and 78 is less than the width of the control ports 70 and 72, which correspond thereto. When lever 80 is shifted to position N, an open center condition is provided; that is, lands 76 and 78 are so positioned, with respect to their corresponding control ports 70 and 72, that supply port 64 is in continuous communication with return ports 66 and 68. This allows fluid supplied by pump 16 to flow unrestricted from supply conduit 28 through valve 38 to return conduit 30. This provides the transmission 10 with a neutral mode of operation. When lever 80 is moved to position F, as illustrated in FIG. 1, lands 76 and 78 are interposed between ports 66 and 70, and ports 64 and 72 respectively; thus communicating supply port 64 with motor port 56 and motor port 58 with return port 68. This directs fluid supplied by pump 16 to motor port 56, which functions as an inlet port for motor 22. Fluid from motor port 58, which functions as an outlet port for motor 22, is returned to pump 16 through the return conduit 30. When lever 80 is in position F, motor 22 rotates in such a direction as to propel the vehicle in what will be termed for convenience, a forward direction. Similarly, when lever 80 is moved to position R, supply port 64 communicates with motor port 58 and motor port 56 communicates with return port 66. This directs fluid supplied by pump 16 to motor port 58, which now functions as an inlet port for motor 22; fluid from motor port 56, which now functions as an oulet port for motor 22, is returned to pump 16 through return conduit 30. This causes motor 22 to rotate in an opposite direction, propelling the vehicle in a reversed direction.

The portion of supply conduit 28 between the sensing valve 24 and the pump 16 will, for convenience, be designated 28a and that portion between sensing valve 24 and control valve 38 as 28b. Sensing valve 24 comprises a body 82 having an inlet port 84 connected to the portion 28a and an outlet port 86 connected to the portion 28b of supply conduit 28. A venturi shaped passage 88 having a throat 90 is located in body 82 between the inlet and outlet ports 84 and 86. The body 82 has a longitudinal bore 92 having an inner wall 94 dividing bore 92 into a spring chamber 96 and a pressure chamber 98. Pressure chamber 98 communicates with venturi passage 88 and inlet port 84, such that the fluid pressure therein is equivalent to the supply pressure of fluid delivered by pump 16 in conduit 28a. A pressure responsive piston 100 is slidably fitted in a hole 102 in wall 94. Piston 100 is tapered at one end, forming a needle 104 which extends into throat 90. Movement of the needle 104, with respect to throat 90, varies the effective area of throat 90 and thus the flow restrictive effect of venturi 88. Piston 100 has axially spaced shoulders 106 and 108, which limit its movement and thus the minimum and maximum effective area of the venturi 88. That is, when shoulder 106 abuts wall 94 the effective area of venturi 88 is a minimum; and when shoulder 108 abuts wall 94 the effective area is a maximum. The cross-sectional area of piston 100 forms a pressure effective area against which the fluid pressure in chamber 98 acts to actuate piston 100. Piston 100 is normally biased downward by a spring 110 to a minimum area position and is hydraulically actuated upward when the fluid pressure in chamber 98 reaches a value sufficient to overcome the opposing force of spring 110. The use of a venturi such as venturi 88 minimizes the pressure loss of the supply pressure as fluid flows from inlet port 84 to the outlet port 86. An external sensing port 112 in body 82 communicates with throat 90 of venturi 88. As fluid flows through sensing valve 24, a pressure differential is established between the fluid pressure of the supply fluid entering inlet port 84 and the fluid pressure of the supply fluid at throat 90 which is reflected at sensing port 112. This pressure differential is a function of both the flow rate of supply fluid through sensing valve 24 and the effective area of the venturi 88. For instance, the pressure differential will increase at a gradual rate when the supply fluid flow rate and venturi area are increased simultaneously, whereas the pressure differential will increase rapidly if the venturi area remains constant and only the supply fluid flow rate is increased. Thus, a greater increase in flow rate is required to achieve the same incremental increase in pressure differential when the venturi area and flow rate are increased simultaneously. Since piston 100 is pressure responsive to vary the effective area of venturi 88 as a function of supply pressure, the pressure differential produced by sensing valve 24 is a function of both flow rate and pressure of fluid supplied by pump 16. Thus, since the flow rate and pressure of supply fluid is a function of engine speed and engine torque, the pressure differential is also a function of engine speed and torque. Since engine speed and torque are functions of throttle position, this pressure differential is also a function of the position of throttle 20. An adjusting screw 114 is provided at the end of body 82 for varying the biasing force of spring 110 on piston 100.

The by-pass valve 26 has a body 116 having a longitudinal bore 118 closed at each end. Body 116 has an inlet port 120 and a return port 122 longitudinally spaced apart and communicating with bore 118. Inlet port 120 is connected by conduit 124 to supply conduit 28b. Return port 122 is connected to return conduit 30 by a conduit 126. A spool 128 is slidably mounted within bore 118 for longitudinal movement therein. Spool 128 has an annular groove 130 centrally located, thus forming lands 132 and 134 at the ends thereof. Spool 128 divides bore 118 into a pressure chamber 136 and a spring chamber 138 containing spring 140. Spring 140 normally biases spool 128 to the right so that inlet port 120 communicates with return port 122, thereby providing a by-pass condition, the flow resistance of which is less than that posed by motor 20, allowing supply fluid from pump 16 to completely by-pass motor 22. The ends of spool 128 form pressure effective areas which are exposed to the fluid pressure in pressure chamber 136 and spring chamber 138. Pressure chamber 136 is connected to supply conduit 28a by a conduit 142 and spring chamber 138 is connected by a conduit 144 to sensing port 112 of the sensing valve 24, such that the pressure differential between chambers 136 and 138 is the same as the pressure differential produced by the sensing valve 24. When the pressure differential control signal produced by the sensing valve 24 reaches a predetermined value sufficient to overcome the biasing force of spring 140, spool 128 will be actuated to the left. As spool 128 moves to the left, land 134 begins to restrict fluid flow through inlet port 120. This increases the pressure in conduit 28b and, in turn, results in a corresponding pressure increase in conduit 28a. When the pressure differential increases sufficiently, spool 128 is actuated to the left such that land 134 will completely block inlet port 120. When this occurs, all fluid delivered by pump 16 is directed to motor 22. An adjusting screw 146 is provided in the end of body 116 adjacent spring chamber 138 for varying the biasing force of spring 140 on spool 128.

A pair of relief valves 148 and 150 are connected to supply conduit 28 and return conduit 30 respectively, to prevent over pressurization of either the supply or return conduits. Relief valves 148 and 150 are connected to a common return line 158 for returning fluid to control circuit 14. A case drain conduit 152 extends between pump 16 and motor 22 for returning any internal leakage from either unit to a reservoir 154.

Control circuit 14 includes control pump 32 and compensator valve 34. Pump 32 is a conventional positive displacement type unit having a fixed capacity connected to compensator valve 34. A suction line 156 is connected to reservoir 154 and an outlet conduit 158. Pump 32 is driven by engine 18 through the same shaft 40 that drives pump 16. Compensator valve 34 has a body 160 having a longitudinal bore 162 closed at each end. Body 160 has an inlet port 164, a cylinder port 166, and a return port 168, each of which communicates with the bore 162. Inlet port 164 is connected to control pump outlet conduit 158. Cylinder port 166 is connected to the motor swash plate control cylinder 36 by a conduit 170. Return port 168 is connected to reservoir 154 by a conduit 172. A spool 174 is slidably mounted within bore 162 for longitudinal movement therein. Spool 174 has an annular groove 176 centrally located, forming lands 178 and 180 at the ends thereof. Spool 174 divides bore 162 into a pressure chamber 182 and a spring chamber 184 containing a spring 186. The ends of the spool 174 form pressure effective areas exposed to the fluid pressure in pressure chamber 182 and spring chamber 184. Pressure chamber 182 is connected to supply conduit 28a by a conduit 190 and spring chamber 184 is connected to sensing port 112 of sensing valve 24 by conduit 144 and a conduit 192 such that the pressure differential between chambers 182 and 184 is equal to the pressure differential produced by the sensing valve 24. Spool 174 is normally biased by spring 186 to the right, providing an open position whereby inlet port 164 and cylinder port 166 are in continuous communication. This open position allows fluid delivered by pump 32 to flow directly to control cylinder 36 for actuating piston 50. An adjusting screw 188 is provided at the end of body 160 for adjusting the biasing force of spring 186.

A relief valve 194 is connected between outlet conduit 158 of pump 32 and case drain 152. This relief valve maintains an outlet fluid pressure of pump 32 sufficient to actuate piston 50 to the right against the force of spring 54 in control cylinder 36 and the hydrodynamic forces on swash plate 44. The pressure differential established by sensing valve 24, which operates by-pass valve 26, is also employed to operate compensator valve 34. Thus, when a predetermined pressure differential is reached between chambers 182 and 184 sufficient to overcome the biasing force of spring 186, spool 174 will begin to move to the left. As spool 174 moves, land 178 begins to block port 164 and when the pressure differential increases sufficiently, spool 174 is actuated such that land 178 will block inlet port 164 completely, and land 180 will begin to uncover return port 168 so that it communicates with cylinder port 166 thus allowing fluid to escape from control cylinder 36 to reservoir 154. As fluid escapes from control cylinder 36, the fluid pressure therein decreases allowing spring 54 to return piston 50 toward its normal position, thereby reducing the displacement of motor 22. As the pressure differential continues to increase, land 139 further uncovers return port 168, allowing fluid to escape from control cylinder 36 more rapidly. The magnitude of pressure differential required to operate the compensator valve 34 is higher than that to operate the by-pass valve 26, thus compensator valve 34 does not begin to operate until by-pass valve 26 is completely closed. This sequence of operation is achieved by properly selecting the preload forces of springs 140 and 186. Check valves 196 and 198 are connected between the control circuit outlet conduit 158 and the power circuit supply conduit 28 and the return conduit 30, respectively. One of these check valves permits the replenishing of the low pressure conduit of the power circuit 12, while the other blocks the flow of high pressure fluid from the high pressure conduit to the control circuit 14. Thus, the control pump 32 also serves as a source of replenishing fluid for power circuit 12.

The components which comprise the transmission 10 may be, for convenience, integrated into a pump package and a motor package. The pump package 200 could include all those components enclosed within the rectangular package illustrated by the dotted lines designated by the numeral 200 and similarly the motor package could include all those components enclosed within the rectangular package illustrated by the dotted lines designated by numeral 202.

*Detailed operation*

In operation, the lever 80 of the directional control valve 38 is actuated to position N for starting the engine 18. Once the engine is started, it drives the power pump 16 and the control pump 32. The fluid supplied by pump 16, hereinafter referred to as supply fluid, flows in supply conduit 28 through sensing valve 24 to both the directional control valve 38 and the by-pass valve 26. Since control valve 38 is positioned to provide an open center condition and since by-pass valve 26 is normally in a by-pass condition, supply fluid flows substantially unrestrictedly through each valve back to pump 16 through return conduit 30. Simultaneously, the fluid supplied by pump 32 hereinafter referred to as control fluid, flows in conduit 158 to compensator valve 34. Since the compensator valve 34 is normally in an open condition, control fluid flows directly to control cylinder 36. The pressure of the control fluid immediately increases to a valve sufficient to overcome the force of spring 54 actuating piston 50 to the right. This shifts swash plate 44 to as to increase the displacement of motor 22 to a maximum. After piston 50 has been fully actuated to the right, the control fluid continues to increase in pressure until relief valve 194 opens allowing control fluid to flow to the case drain line 152. The pressure of the control fluid is thus maintained at the relief valve setting. Control fluid at this pressure also serves to replenish the power circuit conduits 28 or 30 through check valves 196 or 198 respectively, whichever conduit is at low pressure. The flow capacity of pump 32, though relatively small in comparison to that of pump 16, is sufficient to provide adequate flow for operating the control cylinder 50 and replenishing the power circuit 12.

The open center condition of control valve 38 provides the transmission 10 with a neutral mode of operation, so that engine 18 may be operated at high speeds without causing vehicle motion. When engine 18 is operated at high speeds with the transmission in this neutral mode of operation, the flow of supply fluid through sensing valve 24 establishes a pressure differential sufficient to operate both the by-pass valve 26 and compensator valve 34. But, since control valve 38 is in an open center condition, supply fluid continues flowing through valve 38 to return conduit 30 without affecting motor rotation and, thus, vehicle motion.

To initiate vehicle movement, only two manual operations must be performed by the operator. First, lever 80 must be actuated to either position F or R, which positions control valve 38 so as to provide either forward or reverse vehicle movement, respectively. Once lever 80 is properly positioned, the operator must then actuate throttle 20 to a position whereby the transmission 10 through shaft 42 will deliver sufficient power to drive the wheels of the vehicle against the load opposing vehicle motion. This load is commonly referred to as tractive resistance, which is a function of such factors as the total weight of the vehicle and the condition and grade of the road surface.

The transmission 10 will not develop sufficient power to overcome the tractive resistance when the throttle 20 is retained in an idle position; and thus the vehicle will not move. This is because the flow rate of supply fluid through sensing valve 24, during idle engine speed operation, is not sufficient to establish the required pressure differential necessary to operate by-pass valve 26 so as to provide sufficient supply fluid pressure to drive motor 22. Thus during idle engine speed operation, all the supply fluid flows through by-pass valve 26 to return conduit 30. This provides transmission 10 with a feature which prevents the vehicle from creeping during idle operation.

To accelerate the vehicle, throttle 20 is actuated to a position above idle. Assume lever 80 is shifted to position F and throttle 20 is actuated to a position which will provide sufficient power from the transmission 10 to drive the vehicle. Initially, the supply fluid flows through sensing valve 24 and by-pass valve 26 and is returned to pump 16. As the speed of engine 18 increases in response to the position of throttle 20, the flow rate of supply fluid correspondingly increases proportionately. As the engine speed and supply fluid flow rate increases, the pressure differential produced by sensing valve 24 increases. When the engine speed and supply fluid flow rate reaches a predetermined value, this pressure differential begins shifting by-pass spool 128 to the left and land 134 begins restricting the flow of supply fluid through the by-pass valve 26. This, in turn, causes an increase in pressure of supply fluid in conduit 28b and a proportionate increase in pressure of supply fluid in conduit 28a. As the engine speed and supply fluid flow rate continues to increase, the pressure differential produced by sensing valve 24 increases causing a greater restriction to the flow of supply fluid through by-pass valve 26, which in turn further increases the pressure of supply fluid in conduits 28b and 28a. When the pressure of supply fluid reaches a predetermined value, sensing valve piston 100 is actuated upward, which begins withdrawing needle 104 from throat 90. This enlarges the effective area of venturi 88. As the pressure of supply fluid continues to increase in response to subsequent increases in engine speed and supply fluid flow rate, piston 100 continues to move upward further enlarging the area of venturi 88. Since the restricting effect on supply fluid flow through the by-pass valve 26 is a function of the pressure differential produced by the sensing valve 24 and since this pressure differential is a function of both the flow rate of supply fluid through the venturi 88 and the area of the venturi 88, each succeeding incremental increase in pressure differential, after piston 100 begins moving upward enlarging the area of venturi 88, requires a subsequently larger incremental increase in the flow rate of supply fluid. Thus, the sensing valve 24 produces a pressure differential which controls by-pass valve 26 such that the pressure of supply fluid gradually increases as a function of engine speed. This gradual increase in supply fluid is by-passing motor 22 through by-pass valve 26. During this by-pass condition the transmission 10 is said to be stalled. That is, the engine 18 delivers input power to the transmission 10 through pump 16, but motor 22 is not delivering any output power to the vehicle wheels. Thus, when the transmission 10 is stalled, all the fluid supplied by pump 16 by-passes motor 22 through the by-pass valve 26 and is returned to pump 16 through return conduit 30.

As the engine speed continues increasing the pressure of supply fluid eventually reaches a value at which the output torque of the transmission 10, that is output torque of motor 22, equals the tractive resistance opposing vehicle motion. At this instant the resistance to fluid flow posed by the by-pass valve 26 and that posed by the motor 22 are substantially the same. However, since the pressure of supply fluid at this instant is insufficient to accelerate the motor 22, supply fluid continues flowing through by-pass valve 26. As the engine speed increases above this instant value, the increased supply fluid flow rate increases the pressure differential further, closing by-pass valve 26 which, in turn, increases the supply fluid pressure. Since the fluid pressure necessary to initially drive motor 22 remains substantially constant, the pressure of supply fluid in excess of that serves to accelerate the motor. The pressure differential gradually increases to a value which is sufficient to close by-pass valve 26 entirely, directing all supply fluid to the motor 22. At the instant the by-pass valve 26 closes, the transmission 10 is completely engaged. That is, pump 16 and the motor 22 are hydraulically coupled, in that all the fluid delivered by pump 16 flows to the motor 22. Thus, engagement of the transmission 10 begins when the motor initially starts rotating and is complete when the by-pass valve 26 is completely closed. After the transmission 10 is fully engaged, the supply fluid pressure matches the engine torque-speed schedule for the particular position of throttle 20. This will be more fully explained in the detailed discussion of FIG. 2.

As the speed of engine 18 continues to increase after transmission engagement, the motor 16 proportionately increases in speed. Since the output torque of engine 18 gradually decreases as its speed increases, the supply fluid pressure decreases proportionally. This allows piston 100 of sensing valve 24 to move downward, reducing the area of venturi 88 which, in combination with the increased supply fluid flow rate increases the pressure differential. When the pressure differential reaches a predetermined value, the compensator valve spool 174 is shifted toward the left. As spool 174 moves toward the left, land 178 blocks the flow of control fluid from pump 32 to control cylinder 36 and land 180 uncovers port 168 permitting fluid to escape from control cylinder 36. This reduces the pressure acting on piston 50 allowing spring 54 to actuate piston 50 to the left, shifting swash plate 44 so as to reduce the displacement of motor 22. As the engine speed continues to increase, the compensator valve 34 throttles the escape of fluid from control cylinder 36 allowing spring 54 to smoothly return swash plate to its minimum displacement position. As motor displacement is reduced from a maximum to a minimum, the transmission ratio of output torque and speed changes from a high torque/low speed to a low torque/high speed condition. The engine speed range, during which motor displacement is varied from a maximum to a minimum is commonly referred to as the transmission shift range. This shift range occurs over a relatively narrow range of engine speed, for instance, approximately 200 r.p.m. Since the compensator valve 34, as controlled by sensing valve 24, provides a smooth change in motor displacement, the change in transmission ratio is completely smooth and stepless throughout this shift range. The over-all transmission ratio may be changed by varying the minimum displacement position of swash plate 36, such as by varying the stroke of piston 50. Transmission ratios of up to 5:1 are practical with this transmission and will meet the requirement of a majority of vehicle applications.

The engine 18 will continue increasing in speed after the transmission ratio is reduced to a minimum and thus the motor 22 and the vehicle will continue to increase in speed until the torque output of the transmission 10 matches the tractive resistance or until engine governor speed setting is reached. Once either condition is reached, the vehicle continues moving but at a constant speed.

In the event the load on the vehicle increases, such as would occur if it encountered a hill, such increase in tractive resistance is reflected by an increase in supply fluid pressure. This increased pressure causes a reduction in engine speed. As engine speed decreases its output torque increases and similarly the output torque of the transmission. If the increased load cannot be matched by the increased output torque of the transmission as the engine slows down, the engine will continue to decrease in speed until the reduced supply fluid flow rate through sensing valve 24 provides a control signal which begins increasing the displacement of motor 22 to a value whereby the increased load is matched by the torque output of the transmission 10. If an excessive load is encountered not only will motor 22 return to its maximum displacement position, but when the pressure differential operating by-pass valve 26 decreases sufficiently, by-pass valve 26 opens allowing supply fluid to by-pass motor 22. This removes the excessive load from engine 18 and prevents it from stalling. If the load is not too excessive, the by-pass valve will maintain a supply of fluid pressure to motor 22 which matches the load and thus prevents the load from driving the vehicle backwards. If, however, the load cannot be matched by supply fluid pressure when the throttle 20 is at its full throttle position, the vehicle will be forced backwards. In which case the fluid flow from pump 16 and motor 22 will be forced through by-pass valve 26.

To decelerate the vehicle, throttle 20 is moved from its previous position for acceleration toward its idle position. This is commonly referred to as over-running deceleration. That is, the vehicle wheels are over-running the engine, in that the vehicle's wheels are rotating at a higher speed than what the engine 18 could drive them through the transmission. The rate of deceleration depends on vehicle tractive resistance and on how rapidly the throttle 20 is returned to its idle position. During over-running deceleration, motor 22 functions as a pump being driven by the wheels of the vehicle, and pump 16 functions as a motor being driven by the fluid from motor 22. The engine 18 comprises the load on pump 16 and provides engine retardation to decelerate the vehicle. During deceleration the by-pass valve 26 and the compensator valve 34 function in reverse order to the sequence of operation during an acceleration cycle. For example, assume throttle 20 has been initially actuated to a maximum throttle position and the vehicle had accelerated to a speed where the motor 22 is operating at a minimum displacement position. When throttle 20 is returned to its idle position, the speed of engine 18 decreases, which in turn decreases the flow from pump 16 through sensing valve 24. This reduces the pressure differential which operates the compensator valve 34 and the by-pass valve 26. When this pressure differential decreases sufficiently, spring 186 returns spool 174 of the compensator valve 34 toward its normal open position. As spool 174 moves toward its open position, fluid pressure from pump 32 gradually actuates piston 50 of control cylinder 36 to the right, increasing motor displacement as vehicle speed decreases. As the speed of engine 18 and the flow through sensing valve 24 continues to decrease after the displacement of motor 22 reaches a maximum, the pressure differential operating by-pass valve 26 further decreases, allowing spring 140 to shift spool 128 toward its normal by-pass position. When by-pass valve 26 reaches its full by-pass position, motor 22 is completely unloaded. That is, the flow rate of fluid from motor 22 which exceeds the consumption rate of pump 16 will flow unrestricted from conduit 30 through the by-pass valve 26 to conduit 28 and back to the motor 22. At this point, the vehicle is in a coasting mode of operation, that is, the transmission is completely disengaged. The vehicle will gradually coast to a stop if permitted to do so. If, however, a more rapid stop is desired, the vehicle brakes may be applied.

Since the direction of rotation of motor 22 is controlled by the directional control valve 38, which simply alternates the flow to and from the motor 22, the operation of transmission 10 is identical in either a forward or a reverse mode of operation.

Referring now to FIG. 2, which illustrates the comparative performance of the transmission 10 and the engine 18, the output torque of the engine 18 and the supply fluid pressure of pump 16 being directly proportional to one another are referenced along the vertical coordinate and the speed of engine 18 and the supply fluid flow rate of pump 16 being directly proportional to one another are referenced along the horizontal coordinate. Curves W, X, Y, and Z are representative of a family of curves of the output torque schedule of engine 18 as a function of engine speed for various positions of throttle 20. These curves are commonly referred to as engine torque curves. Curve W corresponds to a maximum or full throttle position; curves X and Y each correspond to partial throttle positions; and curve Z represents an idle throttle position.

Curve A is a plot of supply fluid pressure as a function of supply fluid flow rate throughout the entire range of throttle movement when all the fluid supplied by pump 16 is by-passing motor 22 through by-pass valve 26. This curve is commonly referred to as the transmission stall curve and thus represents the stall characteristics of the transmission 10 throughout the entire range of throttle movement. Points A1, A2, and A3 are stall points on the engine torque curves W, X, and Y, respectively. The range of engine 18 at which the transmission stall point occurs depends upon the position of throttle 20. As shown by curve A, these stall points occur at increasing engine speeds as the position of throttle 20 is actuated toward its full throttle position. This is accomplished by controlling the by-pass valve 26 with the control signal provided by the sensing valve 24. As can be seen in FIG. 2, each throttle curve has a point at which maximum engine torque output occurs. These points occur at increasing engine speed, as throttle 20 is actuated toward its full throttle position. Since it may be desirable to deliver maximum torque to the vehicle drive wheels when the vehicle is initially started, it may thus be desirable to being transmission engagement at these maximum engine torque points. By properly coordinating such design parameters as the spring ratio, venturi area varying rate and size, and piston and spool movement of the sensing valve 24 and the by-pass valve 26, the stall curve A can be made to follow closely these points.

Curves C and D represent transmission stall curves if the by-pass valve is controlled by a sensing valve having a fixed area orifice. Curve C is produced if the fixed area orifice has an area equivalent to the minimum area of venturi 88, whereas curve D will result if the fixed area orifice is equal to the maximum area of venturi 88. As shown by curves C and D, the transmission stall points occur at nearly the same engine speed regardless of changes in throttle position. Thus, the stall points along curve C occur at low engine speeds before the engine develops maximum torque, whereas the stall points along curve D occur at the higher engine speeds when the engine torque begins decreasing after having reached maximum torque.

Curve B is a plot of supply fluid pressure as a function of supply fluid flow rate at the instant by-pass valve 26 closes. This curve thus represents the points at which the transmission 10 becomes fully engaged for various positions of throttle 20. This curve is commonly referred to as the transmission lock-up curve. Thus, points B1, B2, and B3 represent the points on engine torque curves W, X, and Y at which the by-pass valve 26 is closed directing all supply fluid delivered by pump 16 to motor 22.

Curve E represents the points at which the transmission begins shifting from a high torque/low speed condition toward a low torque/high speed condition for various positions of throttle 20. Correspondingly, curve EE represents the termination of this shifting process. The distance between curves E and EE thus represents the range during which the displacement of motor 22 changes from a maximum to a minimum. This distance is commonly referred to as the shift range of the transmission. At points E1 and E2 and E3 along curves E, the motor 22 is at maximum displacement, and at points E4, E5, and E6 along curve EE, the motor is at minimum displacement. As can be seen from FIG. 2, the transmission shift range occurs during substantially the same incremental change in engine speed, however, initiation of the change in transmission ratio occurs at increasing values of engine speed as the throttle 20 is shifted toward its full throttle position. This is accomplished by the compensator valve 34, which controls the displacement of motor 22, with the control signal provided by the sensing valve 24.

Curves F and FF represent a transmission shift range which results if a fixed area orifice is used to provide the control signal for controlling the compensator valve. Curve G represents the supply fluid pressure necessary to begin actuating piston 100 of sensing valve 24. Thus, below curve G the effect of sensing valve 24 is that of a fixed area orifice.

To fully understand the operation of the transmission 10 and the significance of the curves illustrated in FIG. 2, one complete acceleration cycle of vehicle performance will be hereinafter described. The vehicle operator first places lever 80 in position "N" for starting the engine 18. After the engine is started, the vehicle operator then shifts lever 80 to one of its drive positions, "F" or "R." Assume lever 80 is shifted to position "F." To accelerate the vehicle, the operator actuates the throttle 20 from its idle position toward the maximum or full throttle position. Assume the throttle 20 is actuated to a full throttle position, which produces the full throttle engine torque curve W shown in FIG. 2. As the speed of engine 18 increases in response to this throttle position, the supply fluid flow rate increases. At a predetermined engine speed and supply fluid flow rate the pressure differential, provided by the sensing valve 24, begins closing the by-pass valve 26 restricting the flow of fluid therethrough. This increases the pressure of the supply fluid which, in turn, actuates piston 100 enlarging the area of the venturi 88 in the sensing valve 24. As the speed of engine 18 and the supply fluid flow rate continue to increase beyond this predetermined value, the supply fluid pressure increases along the stall curve A. When the supply fluid pressure increases to a value sufficient to drive the vehicle, supply fluid begins flowing to the motor 22. The position of this point may vary, and is represented by point A4 on curve A in FIG. 2. As the engine speed and supply fluid flow rate continue to increase, supply fluid pressure increases along the dotted line between points A4 and B1. However, the increase in supply fluid pressure as it increases from the stall curve A to the lock-up curve B at point B1 may follow any number of paths in the rectangular area enclosed by points A4, B4, B1, and A1, depending on the tractive resistance. For instance, the supply fluid pressure may increase along the dotted line between A4 and B4 and then follow the lock-up curve B to point B1. Once the vehicle begins moving, the fluid pressure actually necessary to sustain the vehicle in motion decreases below A4 as the speed increases. Thus, the supply fluid pressure in excess of that necessary to sustain vehicle motion accelerates the vehicle. As the engine speed increases between the stall curve A and the lock-up curve B, the by-pass valve 26 is gradually closing, thus directing more and more fluid to the motor 22. At point B1, or at any point along the lock-up curve B between B4 and B1, the by-pass valve 26 is completely closed, fully engaging the transmission 10.

If the vehicle wheel brakes are initially applied to prevent vehicle motion at the time throttle 20 is shifted to the full throttle position, the supply fluid pressure will increase along the stall curve A as engine speed increases. When the supply fluid pressure reaches a value corresponding to point A1, the power output of engine 18 is substantially matched by the hydraulic power output of pump 16. At this point the transmission 10 is stalled but the engine 18 continues to operate at a constant speed and delivering a constant torque corresponding to point A1 without stalling. As the vehicle wheel brakes are gradually released, thus decreasing the load on the vehicle, the supply fluid pressure, at some point, will be sufficient to drive motor 22. As the motor begins rotating, the fluid pressure necessary to drive the motor decreases, allowing engine 18 to increase in speed and thus increase the supply fluid flow rate. This, in turn, begins closing the by-pass valve, directing more and more fluid to motor 22. When the speed of engine 18 reaches a value corresponding to point B1, the by-pass valve 26 is completely closed, directing all supply fluid to the motor 22. Thus, the transmission 10 is completely engaged. The operation of the by-pass valve 26 between points A1 and B1, as well as between A4 and B1, as controlled by the sensing valve 24 provides a smooth engagement of the transmission 10.

As engine speed continues to increase beyond point B1, the supply fluid pressure decreases along the engine torque curve W. This also increases the flow rate of supply fluid to the motor 22 and thus increases vehicle speed. When the speed of engine 18 reaches a value corresponding to point E1, the control signal produced by the sensing valve 24 operates the compensator valve 34, allowing fluid to escape from control cylinder 36, thus decreasing the displacement of motor 22. As the engine speed increases between points E1 and E4, the motor displacement gradually and smoothly decreases from a maximum to a minimum. This changes the transmission ratio from a high torque/low speed ratio to a low torque/high speed ratio. The engine speed will continue increasing which, in turn, continues accelerating the vehicle until the engine speed reaches the engine speed governor setting, shown in FIG. 2, at which point the vehicle will be driven by the transmission at substantially a constant speed.

It should be reemphasized that the foregoing description of vehicle performance pertains to a condition where the tractive resistance at any given engine speed is less than the output torque of the transmission 10, and thus the excess torque developed by the transmission serves to accelerate the vehicle. Thus, beyond point B-1 the vehicle will be accelerated until the engine speed governor setting is reached, or until the tractive resistance matches the available output torque of the transmission, in which case the vehicle will cease to accelerate in speed but will continue at a constant speed. If a load is encountered, such as a hill, and the tractive resistance exceeds the available output torque of the transmission, the engine speed and, consequently, the vehicle speed decreases until the output torque of the transmission increases to a value which matches the increased tractive resistance. For instance, suppose the vehicle is operating at a speed where the engine speed is at a value between point E4 and the engine speed governor setting when the vehicle encounters a sudden increase in load. As the tractive resistance increases, the supply fluid pressure tends to increase. However, since the supply fluid pressure cannot exceed a value corresponding to the engine torque curve W, supply fluid pressure will not reflect immediately the increased load, but will gradually increase while the speed of the engine 18 simultaneously decreases. When the engine speed decreases to a value corresponding to point E4, the reduction in flow rate of supply fluid through the sensing valve 24 causes a corresponding decrease in the control signal which, in turn, allows the compensator valve 34 to open, increasing the displacement of motor 22. As the engine speed continues to decrease due to the gradual increasing supply pressure, the motor displacement continues increasing until the output torque of the transmission matches the tractive resistance or until maximum displacement is reached at point E1. If the load is sufficient, the engine speed will continue to decrease. If the engine speed reaches a value corresponding to point B1, the reduced supply fluid flow rate through the sensing valve reduces the control signal controlling the by-pass valve 26 and if the engine speed continues to decrease, the by-pass valve 24 will open allowing fluid to by-pass motor 22. If the load is sufficient, the by-pass valve will open sufficiently to stall the transmission, however, the engine will continue to operate at a speed corresponding to A1. If the load matches the torque output of the transmission at this stall condition, the vehicle will stop. If, however, the load is greater, the vehicle brakes must be applied by the operator to prevent the vehicle from rolling in the opposite direction.

The operation of the transmission 10 for partial throttle positions is similar to that of the foregoing described full throttle position, however, transmission engagement and the transmission shift range occur at lower engine speeds. For instance, suppose throttle 20 is positioned to provide the engine torque curve X. As engine speed increases, transmission engagement depending, of course, on vehicle tractive resistance is initiated at some point along the stall curve A, not exceeding point A2 and completed at some point along the lock-up curve B, not exceeding point B2. As engine speed continues increasing after transmission engagement, both the engine performance, i.e., speed and torque, and transmission performance, i.e., supply flow and pressure, follow the torque curve W. When engine speed reaches a value corresponding to point E2, the displacement of the motor 22 begins decreasing, and as engine speed continues to increase motor displacement reaches its minimum value at point E5. Engine speed will continue to increase until the power output of the transmission matches the vehicle tractive resistance or until the engine speed governor setting is reached. When either of these conditions is reached, the vehicle will cease to accelerate but will continue to travel at a constant speed. As can be seen by FIG. 2, transmission engagement and transmission shift range occur at a lower engine speed and supply fluid flow rate. The reason being, as previously described, the lower supply pressure provides a smaller effective area of venturi 88, which requires a lower flow rate to produce the necessary pressure differential required to operate by-pass valve 24 and the compensator valve 34.

It can now be seen that this invention provides a throttle responsive hydrostatic transmission having a unique control arrangement, which automatically and smoothly engages the transmission and varies the transmission ratio as a function of engine throttle position. It further can be seen that this invention provides an efficient throttle responsive hydrostatic transmission when operated at low vehicle speeds by engaging the transmission at engine speeds which substantially correspond to optimum engine performance. Still further, it can be seen that this invention provides a hydrostatic transmission which is completely stepless as the transmission ratio is changed from a maximum to a minimum and which provides full power at both high torque/low speed and low torque/high speed conditions for any throttle position.

While the form of embodiment of the invention as herein disclosed constitutes a preferred form, it is to be understood that other forms might be adopted, all coming within the scope of the claims which follow.

What is claimed is as follows:

1. In a hydrostatic transmission the combination comprising a pump, a motor, a supply conduit, and a return conduit connecting the pump and motor for the exchange of fluid therebetween, an engine for driving said pump, throttle means for varying the speed and torque of said engine, sensing means providing a control signal which varies in response to said engine speed and torque, and by-pass means normally diverting fluid supplied by said pump from said supply conduit to said return conduit in response to said control signal for regulating the flow rate of fluid to said motor so as to increase the speed of said motor over a range of engine speeds as a function of engine torque.

2. The combination, as defined in claim 1, wherein said pump has a fixed volumetric displacement and said motor has a variable volumetric displacement and a pressure responsive volumetric control element for varying said displacement between a maximum and a minimum; a source of fluid pressure for actuating said volumetric control element and compensating means responsive to said control signal for regulating the fluid pressure in said control element so as to vary the displacement of said motor over a range of engine speeds as a function of engine torque.

3. The combination as defined in claim 2, wherein said sensing means is arranged in said supply conduit and that said control signal varies in response to an increase in flow rate and in the opposite sense in response to an increase in pressure of fluid supplied by said pump.

4. The combination, as defined in claim 3, wherein said sensing means comprises a flow restrictive means arranged in said supply conduit.

5. The combination, as defined in claim 4, wherein said flow restrictive means includes movable means for varying the flow restrictive effect of said flow restrictive means in response to supply fluid pressure.

6. The combination, as defined in claim 5, wherein said movable means is movable between a first position providing a maximum restrictive effect and a second position providing a minimum restrictive effect.

7. The combination, as defined in claim 6, wherein said movable means is normally biased to said first position and has a pressure effective area in communication with said supply conduit for hydraulically actuating said means from said first position toward said second position in response to the supply pressure in said supply conduit.

8. The combination, as defined in claim 5, wherein the combination of said flow restrictive means and said movable means establishes a venturi shaped flow restrictor.

9. The combination, as defined in claim 2, wherein said by-pass means is arranged in parallel to said supply conduit and said return conduit.

10. The combination, as defined in claim 9, wherein said bypass means is hydraulically connected to said supply conduit at a point between said sensing means and said motor.

11. The combination, as defined in claim 10, wherein said by-pass means includes a valve member actuatable in response to said control signal, having a first position diverting fluid from said supply conduit to said return conduit and a second position for interrupting said fluid diversion and intermediate positions between said first and said second positions for restricting said fluid diversion from said supply conduit to said return conduit.

12. The combination, as defined in claim 11, wherein said valve member is normally biased to said first position and is actuatable to said second and intermediate positions in response to said control signal.

13. The combination, as defined in claim 2, wherein said compensator means is hydraulically interposed by conduit means between said source and said volumetric control element and between said volumetric control element and a reservoir.

14. The combination, as defined in claim 13, wherein said compensator means includes a valve member actuatable in response to said control signal and having a first position providing communication between said source and said volumetric control element, a second position interrupting said communication between said source and said volumetric control element, and a third position throttling the flow of fluid from said element to said reservoir, and intermediate throttling positions between said second and third positions for varying the throttling rate of fluid from said element to said reservoir.

15. The combination, as defined in claim 14, wherein said valve member of said compensator means is normally biased to said first position and is actuatable to said other positions in response to said control signal.

16. The combination, as defined in claim 15, wherein said volumetric control element includes a hydraulically actuatable piston normally biased by means to a first position providing said motor with a minimum displacement and hydraulically actuatable by said fluid from said source to a second position providing said motor with a maximum displacement, said piston being returned by said biasing means toward said first position when said fluid is throttled from said element to said reservoir.

17. In a hydrostatic transmission the combination combination comprising: a fixed displacement pump, a variable displacement motor having a volumetric control element normally biased to provide said motor with minimum displacement and hydraulically actuatable to provide said motor with maximum displacement, a supply conduit, and a return conduit hydraulically connecting the pump and motor for the exchange of supply and return fluid therebetween, an engine for driving said pump, throttle means for varying the speed and torque of said engine, sensing means comprising a variable flow restrictor arranged in said supply conduit and having a movable control member responsive to supply fluid pressure for varying the flow restrictive effect of said restrictor to establish a control signal which varies in response to the flow rate and pressure of supply fluid, by-pass means normally diverting pump supply fluid from said supply conduit to said return conduit, said by-pass means having a valve member for restricting said fluid diversion and directing supply fluid to said motor, said by-pass means being responsive to said control signal for moving said member to increase said restriction of said fluid diversion in response to increases in said control signal and thereby gradually interrupt said fluid diversion engaging said transmission, a source of fluid pressure in communication with said volumetric control element for actuating said element to provide said motor with maximum displacement, compensator means having an actuatable valve member and responsive to said control signal for actuating said member to interrupt said communication between said source and said element and throttle flow of fluid from said element for decreasing the displacement of said motor in response to increases in said control signal and thereby reduce the transmission ratio of said transmission.

18. The combination, as defined in claim 17, wherein a pressure differential is established by the flow of supply fluid through said restrictor, said pressure differential constituting said control signal.

19. The combination, as defined in claim 18, wherein said valve member of said by-pass means is normally biased to a first position for said fluid diversion and has pressure effective areas against which said pressure differential control signal acts for actuating said valve member to a second position to prevent said fluid diversion and to intermediate position for restricting said diversion.

20. The combination, as defined in claim 19, wherein said compensator means is hydraulically interposed by conduit means between said source and said volumetric control element and between said element and a reservoir, said valve member being normally biased to a first position providing communication between said source and said volumetric control element and having pressure effective areas against which said pressure differential control signal acts for actuating said valve member to a second position interrupting said communication between said source and said element and for further actuating said valve member to throttle the flow of fluid from said element to said reservoir.

21. The combination, as defined in claim 20, wherein said compensator valve member and said by-pass valve member are biased to said positions by means such that the pressure differential required to actuate the former is greater than that required to actuate the latter.

References Cited

UNITED STATES PATENTS

| | | | |
|---|---|---|---|
| 2,942,421 | 6/1960 | Hann et al. | 60—19 |
| 3,039,267 | 6/1962 | Voreaux et al. | 60—53 |
| 3,135,087 | 6/1964 | Ebert | 60—53 XR |
| 3,153,900 | 10/1964 | Pigeroulet et al. | 60—19 |

EDGAR W. GEOGHEGAN, *Primary Examiner.*